(12) United States Patent
Sosa et al.

(10) Patent No.: US 6,569,941 B2
(45) Date of Patent: May 27, 2003

(54) PROCESS FOR MANUFACTURING IMPACT RESISTANT MONOVINYLAROMATIC POLYMERS

(75) Inventors: Jose M. Sosa, Deer Park, TX (US); Billy Ellis, Spring, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 09/823,535

(22) Filed: Mar. 30, 2001

(65) Prior Publication Data

US 2002/0173588 A1 Nov. 21, 2002

(51) Int. Cl.[7] .............................................. C08F 279/00
(52) U.S. Cl. .......................... 525/53; 525/316; 526/65; 526/88
(58) Field of Search ........................... 525/52, 53, 316; 526/65, 88

(56) References Cited

U.S. PATENT DOCUMENTS

| 4,081,497 A | * | 3/1978 | Tokumitsu et al. ..... 525/316 X |
| 5,166,260 A | * | 11/1992 | Buonerba et al. ....... 525/316 X |

\* cited by examiner

*Primary Examiner*—Fred Teskin
(74) *Attorney, Agent, or Firm*—Bradley A. Misley

(57) ABSTRACT

The present invention discloses a process for manufacturing monovinylaromatic compounds containing an elastomer to provide increased toughness and strength. One particular embodiment of the invention discloses a process for manufacturing high impact polystyrene wherein styrene monomer containing a dissolved polybutadiene rubber is flowed into an elongated upflow stirred reactor containing three reaction zones, wherein the styrene and rubber are polymerized past the inversion point, then discharged to at least one additional reactor to continue their conversion to polymer.

14 Claims, 9 Drawing Sheets

HIPS manufactured using 3% D-55 rubber and 200 PPM NDM

| Run number | Reactor type | Initiator PPM | R1 Solids | R2 Solids | R1 Temp C | R2 Temp C | Flow g/min | R.T. min |
|---|---|---|---|---|---|---|---|---|
| 1 | EUR | 400 L531 | 15 | | 116 | | 12.0 | 75 |
| 1 | CSTR | | | 62 | | 122 | | 103 |
| 2 | EUR | None | 9 | | 127 | | 13.0 | 69 |
| 2 | CSTR | | | 22 | | 124 | | 95 |
| 3 | EUR | 200 L531 | 16 | | 115 | | 12.1 | 75 |
| 3 | CSTR | | | 34 | | 115 | | 103 |
| 4 | EUR | 200 TAEC | 10 | | 114 | | 13.5 | 67 |
| 4 | CSTR | | | 22 | | 115 | | 92 |
| 5 | EUR | 200 Trig17 | 10 | | 116 | | 12.7 | 71 |
| 5 | CSTR | | | 44 | | 117 | | 97 |

EUR capacity = 903 g of EB (den at 25°C = 0.87 g/cc); H/D=3.5
CSTR capacity = 1236 g of EB; H/D=1.2

PROCESS FOR MANUFACTURING IMPACT RESISTANT MONOVINYLAROMATIC POLYMERS

FIELD OF THE INVENTION

The present invention relates to a process for the continuous production of elastomer-modified high-impact monovinylaromatic polymers.

BACKGROUND OF THE INVENTION

This invention is directed to a continuous process for the manufacture of elastomer-modified monovinylaromatic polymers such as high impact polystyrene (HIPS), and more particularly discloses processes and apparatus for the efficient and economical manufacture of HIPS using a unique primary reactor design to replace the conventional pre-inversion reactor (PIR) to allow better temperature control and improved control of rubber particle size (RPS) of the finished product.

The continuous process for making HIPS material consists of polymerizing styrene monomer in the presence of dissolved rubber. Polystyrene is initially formed from the styrene monomer within the homogeneous rubber solution. The usual rubber types utilized in the manufacture of HIPS include polybutadiene (PB), styrene-butadiene rubber (SBR), and styrene-butadiene-styrene rubber (SBS). Current processes for making HIPS materials most generally utilize two continuous-stirred tank reactors (CSTR) in the initial manufacturing process to control grafting of the elastomer and styrene particles as well as controlling the RPS character of the material. One example of the prior art disclosing the use of CSTR reactors is the patent to Echte, U.S. Pat. No. 4,567,232.

Another patent teaching the continuous manufacture of HIPS, which is an improvement over the above-noted Echte patent, is that granted to Sosa, et al, U.S. Pat. No. 4,777,210, the specification of which is incorporated herein by reference. In the Sosa patent, the first CSTR, which is characterized as the PIR portion of the process, is run at conditions which maintain the reacting solution at a point prior to the rubber/styrene inversion point, i.e., the point at which the solution being reacted goes from polystyrene particles in a rubber/styrene monomer matrix to rubber particles in a polystyrene matrix. The inversion point is achieved in the process taught by the Sosa patent in the second CSTR vessel. The Sosa patent teaches that one key element for determining the inversion point is the viscosity of the reaction solution.

Other related patents disclosing the manufacture of HIPS materials include European Patent Specification, publication number 0 254 304 B1, indicating the inventor as Morita, et al, filed Jul. 22, 1987. This patent is directed to controlling RPS so that it exhibits a narrow distribution. This is achieved using multiple tubular reactors containing static mixers.

The U.S. patent to Miura et al, U.S. Pat. No. 5,194,525, discloses a continuous process for making a polystyrene for injection molding purposes, which is made from styrene monomer and a polymerizable unsaturated fatty acid, using a tubular reactor with fixed plural mixing elements formed on the inside thereof.

U.S. Pat. No. 4,521,569 to Bubeck et al, teaches the manufacture of HIPS materials having improved stress crack resistance wherein the polystyrene is polymerized using an aliphatic hydrocarbon as a polymerization solvent rather than an aromatic or cycloaliphatic hydrocarbon. Other patents teaching the manufacture of HIPS materials include U.S. Pat. No. 3,658,946 to Bronstert; and U.S. Pat. No. 4,144,204 to Mittnacht, et al.

European Patent Application No. 0 400 479 filed May 23, 1990, and assigned to Montedipe S.r.l., discloses a process of manufacturing HIPS materials wherein a downflow configured plugflow reactor having reaction zones is used when polymerizing monovinylaromatic monomers with rubber, a vinyl-cyanide comonomer, and a diluent.

Two patents to Cantrill and Doyle, assigned to Novacor Chemicals (International) S.A. of Fribourg Switzerland, U.S. Pat. No. 5,551,859 and Canadian 2,136,655, disclose the process of converting a stable partially polymerized syrup comprising dispersed rubber-like composite particles in a resin phase into a metastable syrup in which the rubber-like composite and resin phases are co-continuous, by subjecting the stable syrup to a high shear under pressure.

One of the critical problems of the above-described prior art processes for manufacturing HIPS materials involves the ability to control grafting and RPS distribution in the first reactor. The prior art processes generally all utilize PIR type reactors to control these properties. Because the reaction occurs so slowly in the first reactor in order to maintain low conversion, the heat of reaction is insufficient to maintain the reaction and a preheater must be utilized to add heat to the solution in order to maintain good temperature control. This is especially true when HIPS manufacturing processes utilize feed solutions having less than five percent by weight of elastomer contained in them.

This addition of heat through a preheater causes another problem to occur in conventional processes. That problem with the prior art process designs is that many of them must utilize internal heat exchanger tubes in one of the secondary reactors in order to remove the excessive heat of reaction from the reactor that occurs due to the added heat that is initially put into the reaction with the preheater.

The present invention overcomes these problems by providing a process which greatly reduces and in most cases eliminates the need for preheaters and internal tube heat exchangers in the polymerization process.

SUMMARY OF THE INVENTION

The present invention overcomes the disadvantages of the prior art HIPS manufacturing processes by replacing the normal CSTR type of initial reactor used as a preinversion stage reactor, with a longer and narrower stirred reactor having a much larger Height to Diameter (H/D) ratio than the conventional PIR type of reactor.

DESCRIPTION OF THE PREFERRED EMBODIMENTS

In most conventional processes for manufacturing HIPS materials, there are generally at least two CSTR vessels at the initial stage of the process. Each CSTR is similar to the other. These reactors comprise vessels in which a set of stirring paddles are rotatably located, generally along the central vertical axis of the vessel. The conventional CSTR vessel will have a cylindrical reaction section having a vertical length or height equal to or slightly longer than the lateral diameter of the vessels, with a height to diameter (H/D) ratio usually not exceeding about 1.5.

In the incorporated Sosa patent described hereinabove, the two initial CSTR vessels consist of a preinversion reactor and an inversion reactor. During a conventional HIPS process, because of the need to control low conversion rates in the first, or preinversion, reactor, insufficient heat of polymerization is created to sustain the reaction, and a preheater must be utilized to add heat to the rubber/styrene monomer feedstock prior to reaction in the first CSTR reactor.

The present invention eliminates the need for a preheater and also allows production rates to be increased significantly over conventional processes by replacing the conventional preinversion CSTR reactor with an elongated upflow reactor (EUR) having a reaction chamber having a length to diameter ratio exceeding 2, with particular embodiments having an H/D ratio of about 3 to about 4. While this is still a stirred reactor just as the CSTR is, the EUR design acts in some ways like a plug-flow reactor (PFR), one of which is utilized in the Sosa patent downstream of the two initial CSTR reactors. However, the EUR is not a plugflow reactor, but is a stirred reactor. Those with experience in reactor design will realize that for first and second order reactions, three to four CSTR type reactors, in series, will approach the performance of a plugflow reactor, within about 85–90%. The use of six to ten CSTR type reactors in series will improve performance to within about 95% of a plugflow reactor. Thus the addition of more CSTRs in series yields a diminishing return; (J. Butt, REACTION KINETICS AND REACTOR DESIGN, Prentice Hall, 1980). By proper selection of radial flow impellers, the EUR can simulate up to 3–5 CSTR type reactors, in series. Further, the EUR can replace the second CSTR type reactor, giving two EURs in series instead of two or more CSTRs or one EUR and one or more CSTRs. By adding a second EUR to the first, the process can better simulate the performance of a plugflow reactor, provided that appropriate mixing and cooling are incorporated in the process also. It is also believed by the inventors that this concept of the EUR can also be applied to the polymerization of copolymers or other elastomer-toughened plastics.

Figure 1:
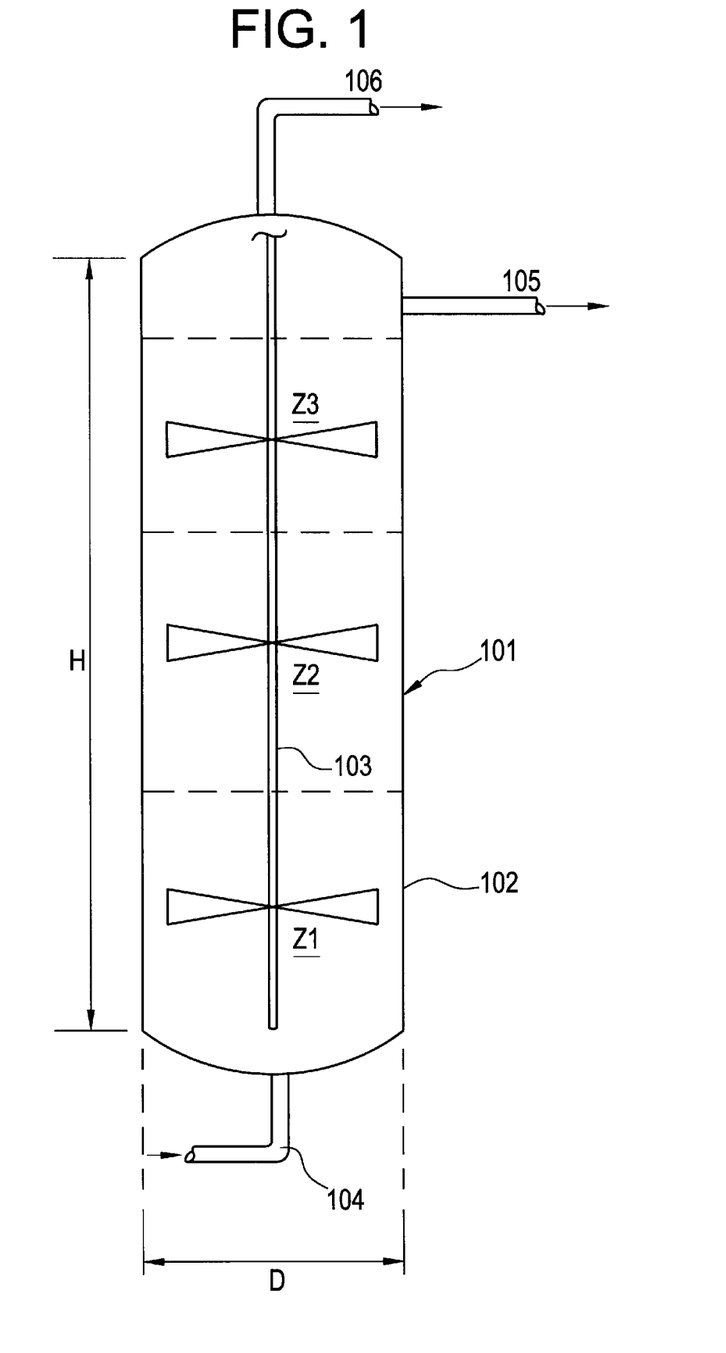
FIG. 1 is a side schematic view of the elongated upflow reactor of the present invention.

In the drawing, the initial reactor is indicated at 101 and consists of a tall narrow reactor vessel 102, preferably cylindrical in shape, and having an axial height indicated at H and a diameter indicated at D. In one preferred embodiment, the ratio H/D was 3.0. A paddle system 103 is located along the central vertical axis to provide shear and mixing of the rubber and styrene constituents of the reaction solution, and prevent clumping of the gel particles being formed. Although not shown, a heater system consisting of a hot oil jacket or electrical heating elements may be provided around the EUR vessel solely to bring the vessel up to operating conditions before initial operation of the process. Once the reaction process enters a steady state, the heating system is shut off and is not needed for as long as the process continues.

An inlet conduit 104 is located at the bottom of reactor 101 and arranged to provide feedstock into the bottom of the reactor. At the top, a discharge conduit 105 exits the top of the reactor to allow discharge of partially polymerized HIPS and non-polymerized reactants. Also at the top of vessel 101 is a vapor recovery line 106 to recover vapors generated in the upper zone of the vessel as more fully described hereinbelow.

The length of the EUR vessel is determined so that the vessel is zoned for different stages of HIPS reaction. The first zone, indicated as Z1 in the figure, is where the polymerization reaction begins and heat of reaction is generated. The middle zone, Z2 is the inversion zone, where phase inversion of the reactants occur; and, the top zone, Z3 is where the solids content of the reaction stream is increased significantly. Also excess heat of reaction is removed in the top zone by allowing vaporization of unreacted styrene monomer and other light elements, with the resulting vapor being recovered, condensed and recycled through recovery line 106 to a condenser (not shown). In one preferred embodiment, the total volume of the EUR reactor is approximately the same as that of the second, conventional CSTR reactor, which is directly downstream of the EUR reactor and receives the products thereof through conduit 105.

In typical operation, a feedstock comprising a solution of styrene monomer in which is dissolved an elastomer such as the polybutadiene rubber, such as that designated as "Diene 55" (produced by the Firestone Tire & Rubber Co.), is introduced with an initiator, such as those disclosed in accompanying Table I, through input line 104 into Zone Z1 of the EUR 101. As previously mentioned, a startup temporary heating source such as hot oil or electric heating elements, is used to bring the reactor up to operating conditions, then the heat source is removed. Stirring paddles 103 are rotated in the solution with a tip speed of about 60 to about 150 feet per minute, to input shear into the solution and prevent clumping of gel particles as they are formed in the reactor.

TABLE I

Peroxides And Other Initiators Used in HIPS Production

| Commercial Name | Chemical Name | Temp. (degrees C.) | |
| --- | --- | --- | --- |
| | | 1 hr halflife | 10 hr halflife |
| Lupersol 531 | 1,1-di-(t-amylperoxy)cyclohexane | 112 | 93 |
| Lupersol 231 | 1,1-di-(t-butylperoxy)-3,3,5-trimethyl-Cyclohexane | 115 | 96 |

TABLE I-continued

Peroxides And Other Initiators Used in HIPS Production

| | | Temp. (degrees C.) | |
|---|---|---|---|
| Commercial Name | Chemical Name | 1 hr halflife | 10 hr halflife |
| Lupersol TAEC | OO-t-amyl-O-(2-ethylbexyl monoperoxy-Carbonate | 117 | 99 |
| Lupersol TBIC | OO-t-butyl O-isopropyl monoperoxy-Carbonate | 118 | 99 |
| Lupersol TBEC | OO-t-butyl-O-(2-ethylhexyl)monoperoxy-Carbonate | 121 | 100 |
| Trigonox 17 | N-butyl-4,4-di(t-butylperoxy)valerate | 121 | 102 |
| Lupersol 233 | Ethyl 3,3-Di-(t-butylperoxy)butyrate | 134 | 114 |
| AIBN | 2,2-azo bis(isobutyronitrile) | 82 | 64 |

Commercially available from Akzo Nobel, 300 South Riverside Rd., Chicago, IL; ATOFINA Chemicals, Market Street, Philadelphia, Pa.; and, Aztec Peroxides, Inc., 7600 West Tidwell, Houston, Texas. NDM is n-dodecylmercaptan, a chain transfer agent.

Because of the presence of the polymerization initiator, polymerization of the styrene monomer begins to occur rapidly in zone Z1 of reactor 101. This generates sufficient heat to bring the polymerization reaction to the inversion stage in zone Z2 as the solution moves upward in the reactor. During its passage through Z2, the solution achieves inversion and becomes a solution of rubber particles in a matrix of styrene and polystyrene mixture.

As the solution progresses through zone Z3, the percent solids of the mixture increases as additional styrene monomer is polymerized around and within the rubber particles. By this point, the heat of reaction is sufficient in zone Z3 to vaporize the lighter components in the solution, such as styrene and ethylbenzene, as well as the byproducts of the initiator, which vaporized products serve to remove heat from the reactor as they are removed from the vessel through line 106.

In a lab trial of the present process, a HIPS material was successfully manufactured on an elongated upflow reactor having an H/D ratio of 3, while the continuous preheater and internal tube heat exchanger were both eliminated. A desirable RPS distribution was also obtained and the capacity of the reactor was increased significantly which compared to a larger size CSTR type of reactor.

In order to provide a comparison of the EUR process of this invention with conventional processes, a dual set of data were compiled using this invention and a conventional process. The conventional process was operated in an existing pilot plant that is intended to operate exactly as would a full size operating plant, but on a much reduced scale. This pilot plant utilized a preheater and a pair of CSTR reactors, followed by PFR type reactors to bring conversion rates up, and vapor condensers to remove the heat of reaction.

Figure 2:
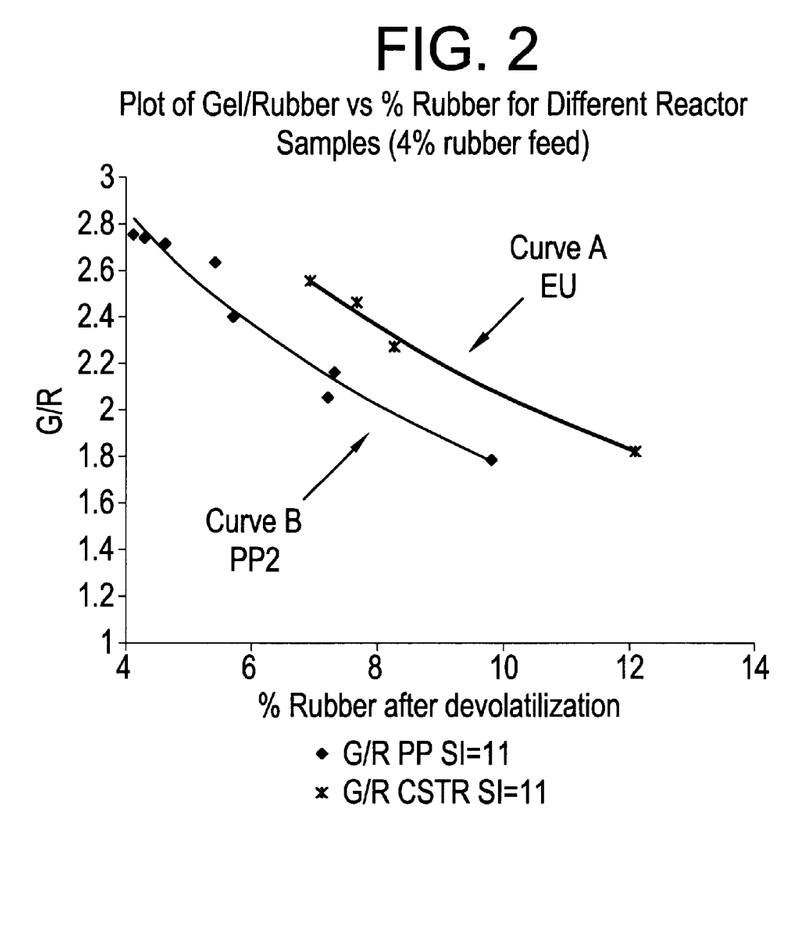
FIG. 2 is a graphic illustration of the gel to rubber ratio (G/R) for various percent rubber reactions in the present invention compared to the same percentages in a conventional HIPS CSTR reactor, when compared at the same swell index.

The process of this invention was performed in a laboratory reactor system utilizing parameters comparable to those of the pilot plant, but on a smaller scale. FIG. 2 is a graph of the gel to rubber ratios (G/R) as a function of percent rubber after devolatilization, of samples of products from an EUR reactor in the lab process (curve A—A), and a conventional CSTR type reactor from the pilot plant (curve B—B), given a 4% initial rubber feed level in both reactors. At any ratio of rubber percent after devol, the EUR reactor shows a significantly higher G/R ratio than that of the conventional CSTR reactor. For example, at 8% rubber level, the G/R of the EUR sample is approximately 2.4, whereas the CSTR sample exhibits a G/R of only 2.0, an increase in the EUR of about 20%. This ratio, the G/R, is important in the manufacture of HIPS materials because it represents the "rubber efficiency" of the process, i.e., how much rubber must be used to obtain similar product quality. The less rubber needed to produce a set of desired properties in a HIPS material, the more efficient the process. The G/R ratios are compared at swell indices of 11.

Figure 3:
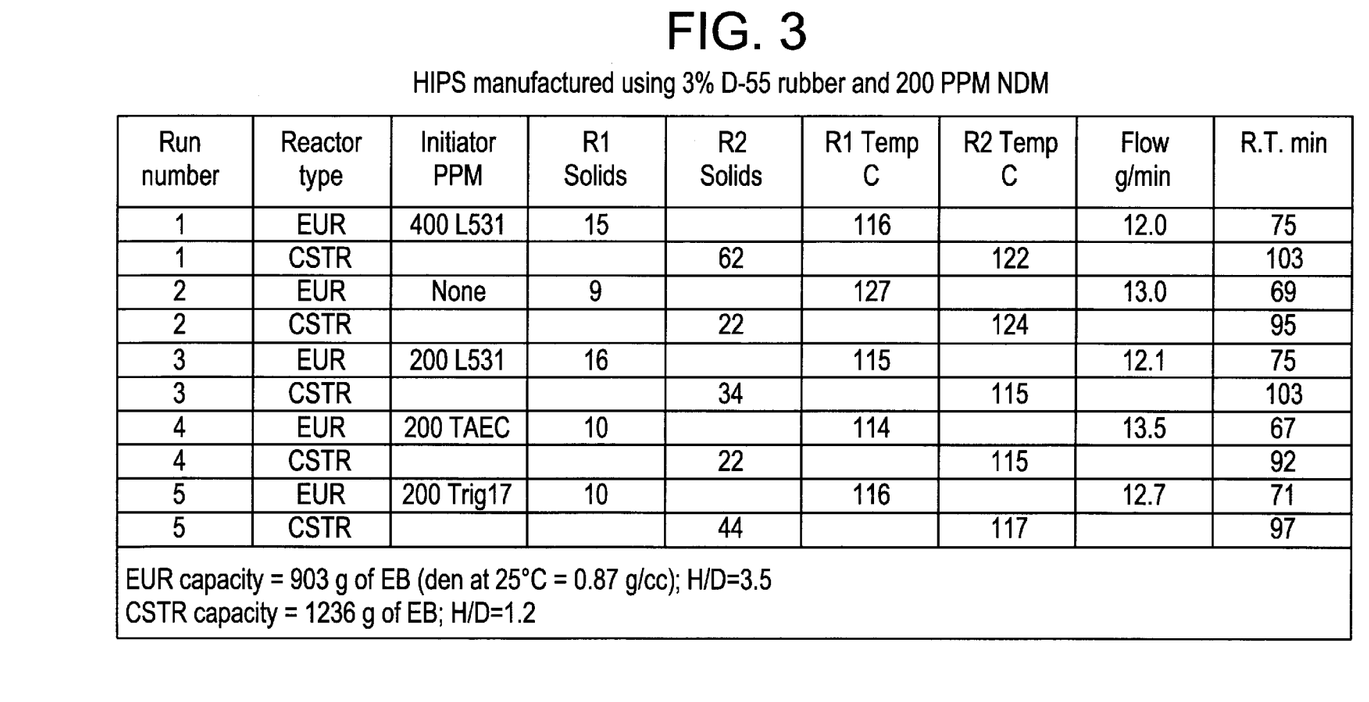
FIG. 3 illustrates the tabulated conditions for various reactor runs utilizing different types of polymerization inhibitors.

In FIG. 3, data is tabulated on various runs through the laboratory process utilizing an initial EUR type lab reactor which has its output fed into a conventional CSTR type lab reactor located downstream of the EUR. The different runs through this lab reactor system varied by the types of initiators utilized in the polymerization system. Samples for each initiator run were drawn from each reactor to illustrate the effects of the different initiators in the two types of reactors of the present inventive process.

Figure 4:
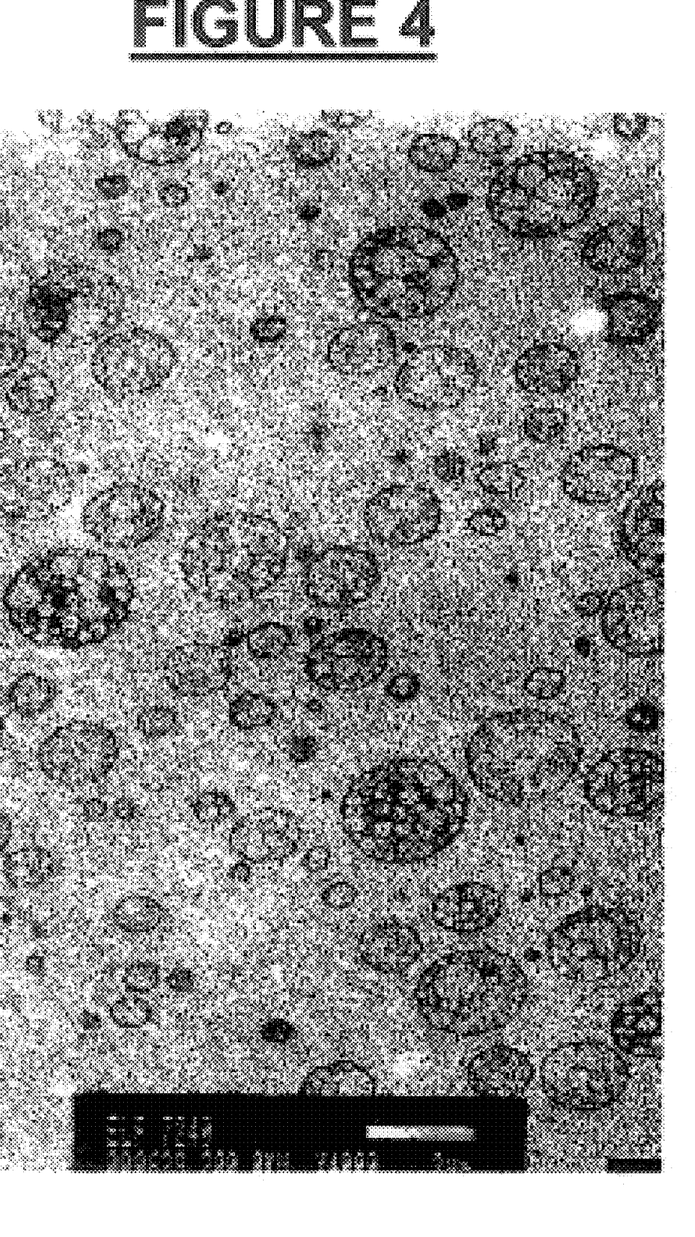
FIG. 4 is a photomicrograph made using transmission electron microscopy (TEM) techniques to illustrate desirable rubber particle size distribution and morphology.

It is well known to those skilled in the art of HIPS manufacture that rubber particle size distribution (RPSD) and rubber morphology both contribute significantly to the impact properties of HIPS materials. In order to illustrate this, a TEM photomicrograph of a HIPS material manufactured in a specific reactor system known to provide excellent RPSD and morphology characteristics is shown in FIG. 4. This material was manufactured commercially on a plugflow type reactor having complex cooling coils inside the reactor to remove heat of reaction and prevent a runaway reaction from solidifying the polymer inside the reactor. This process is slow and very expensive because of the complexity of the reactor and internal cooling system and because it has to be run so slowly as to severely restrict conversion rates and production rates. However, this slow, inefficient and complex system is capable of making benchmark samples of HIPS materials to which samples from much easier, simpler, and faster processes can be compared.

An examination of the RPSD and morphology of the material of FIG. 4 reveals that this material has a desirable rubber particle distribution with no excessive numbers of very small particles nor an excess of very large particles. Also the morphology reveals a desirable "honeycomb" type of particle structure that is consistently uniform in external shape and structure. The particle with this morphology uses the rubber very efficiently and provides good strength and stress crack resistance in the finished HIPS products.

Figure 5:
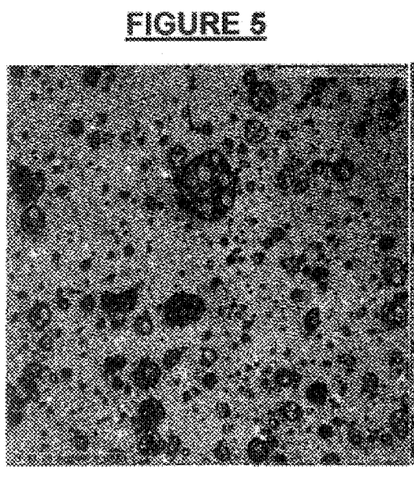
FIGS. 5 and 6 are TEM photomicrographs of HIPS samples manufactured in a pilot plant utilizing conventional CSTR/CSTR reactor sequencing.
Figure 6:
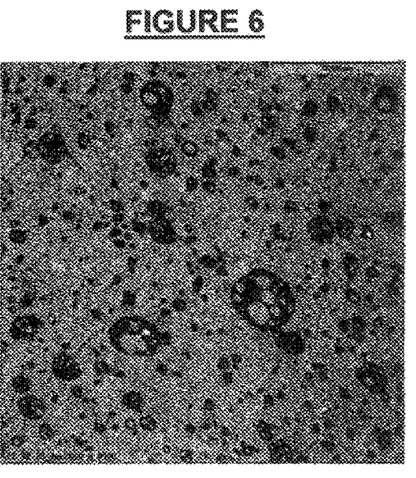

FIGS. 5 and 6 however are TEM photomicrographs of a HIPS material made in the above-mentioned pilot plant having a preheater and two CSTR reactors, followed by at least one PFR type reactor. FIG. 5 represents a sample from the first CSTR and FIG. 6 a sample from the second CSTR.

These two samples have poor RPSD as well as a poor morphology, comparable in no way to the benchmark sample of FIG. 4. The two photomicrographs in FIGS. 5 and 6 represent samples from the two CSTR type reactors in the pilot plant, which utilize H/D ratios of 1.2 and 1.5 to 1 respectively. [In order to "freeze" the morphology of samples with percent solids in the range of from 20–60 percent, the samples are devolatilized at 225 degrees C. for 25 minutes under a vacuum. The samples are then microtomed, stained with osmium tetra-oxide to give contrast between the rubber and the polystyrene, and photographed. The dark areas are produced by the rubber in the sample.]

Those skilled in the art will also recognize that the HIPS resin of FIG. 4 has a more uniform RPSD in that the rubber particles represented by the dark lines in the photo contain large polystyrene inclusions, represented by the white spots. The rubber efficiency (G/R ratio) of the material of FIG. 4 is calculated to be 3.4 whereas the G/R of the material of FIG. 5 is only 2.5, a decrease of almost 30%. [The G (percent gel) is measured by first dissolving the resin in toluene, separating the gel fraction by centrifugation, and then drying the wet gel. The percent gel is then calculated from this dried residue by the formula: Percent Gel=100× dried gel weight, divided by the initial weight of the sample. The percent rubber is measured by the well-known Iodine Monochloride (I—Cl) titration method.]

Figure 7:
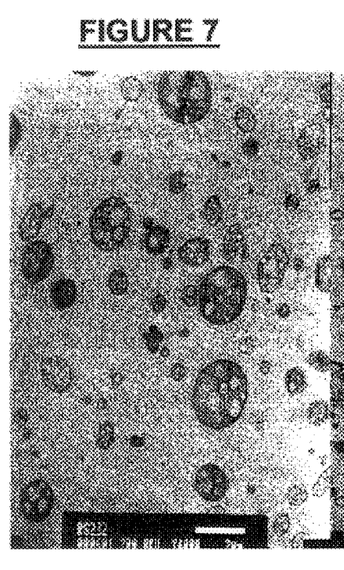
FIGS. 7 and 8 are TEM photomicrographs of HIPS samples manufactured in a lab reactor having the elongated upflow design of the present invention.
Figure 8:
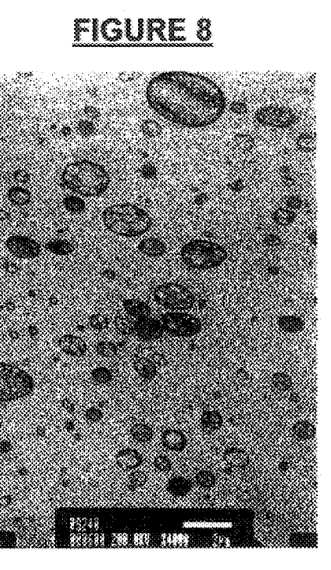

FIGS. 7 and 8 show examples of HIPS material having morphologies more similar to the benchmark material of FIG. 4 than that of conventional materials of FIGS. 5 and 6. The samples photographed in FIGS. 7 and 8 were made in the above-mentioned lab system consisting of an EUR type reactor of the present invention, followed by a conventional CSTR type reactor, having H/D ratios of 3.5 to 1 and 1.2 to 1, respectively. The RPSD of the EUR samples of FIGS. 7 and 8 are excellent, with large evenly formed particles and not a large number of small particles. Also the morphology of the large particles is excellent and approaches that of the benchmark sample of FIG. 4.

Figure 9:
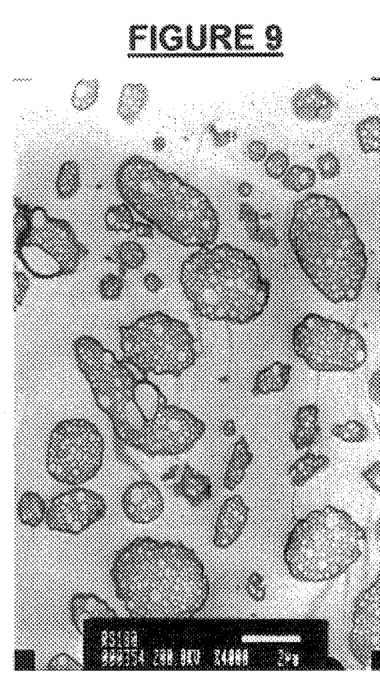
FIGS. 9–15 are TEM photomicrographs of HIPS samples manufactured in a set of lab reactors utilizing an EUR reactor and a CSTR reactor with different polymerization initiators.
Figure 10:
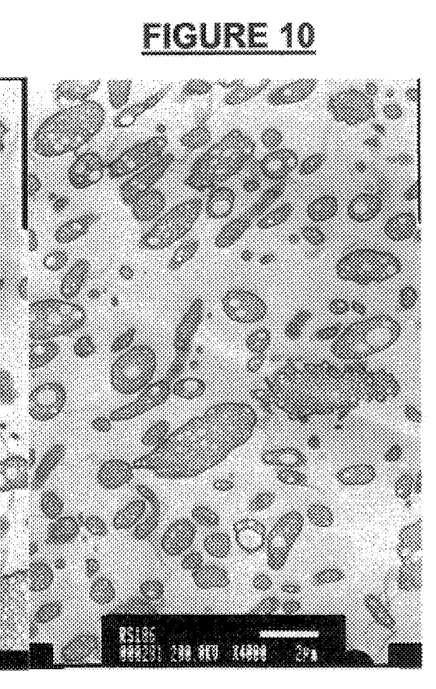
Figure 11:
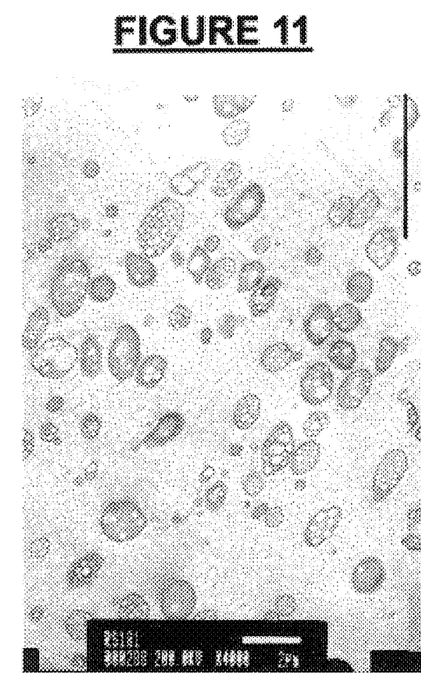
Figure 12:
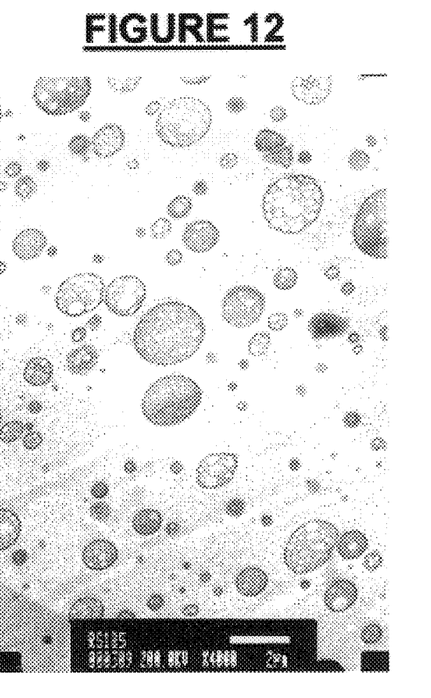

FIGS. 9–15 illustrate the various rubber particle size distributions and morphologies that can be obtained with the present invention utilizing various types of initiators when used with a common chain transfer agent such as NDM. The figures can be correlated with the data contained in the table of FIG. 3. For example, FIG. 9 represents Run No. 1, EUR reactor; FIG. 10 represents Run No. 4 of the EUR reactor; FIG. 11 represents Run No. 1 CSTR reactor, FIG. 12 represents Run No. 3 CSTR reactor. FIGS. 9 and 10 illustrate the morphology of rubber particles immediately after the EUR, while FIGS. 10 and 11 illustrate the morphology immediately following the second CSTR. It is clear that the EUR was operated at conditions which brought the polymerization reaction past the inversion point. In the event that low tip speeds on the stirring paddles in the EUR are utilized, the particles formed can be maintained in the range of 5 to 15 microns. However, the particle size is reduced in the second CSTR by adjusting the viscosity of the medium and the shear rate imparted to the solution. The EUR is typically operated at conditions that insure inversion in the second zone by adjusting the initiator levels, temperatures, and residence times.

Figure 13:
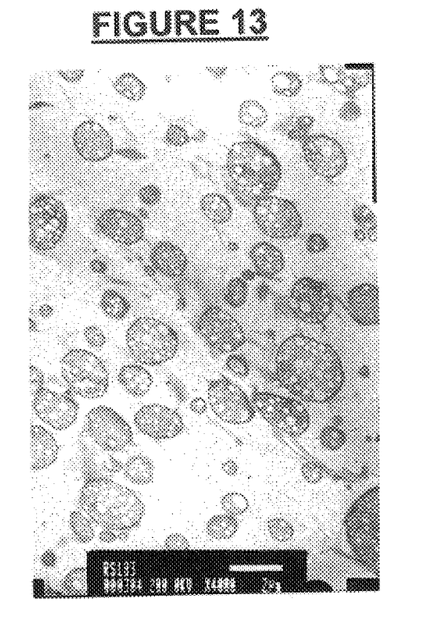
Figure 14:
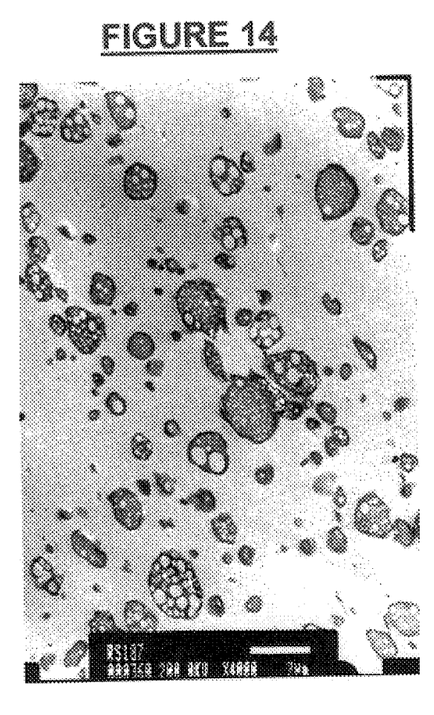
Figure 15:
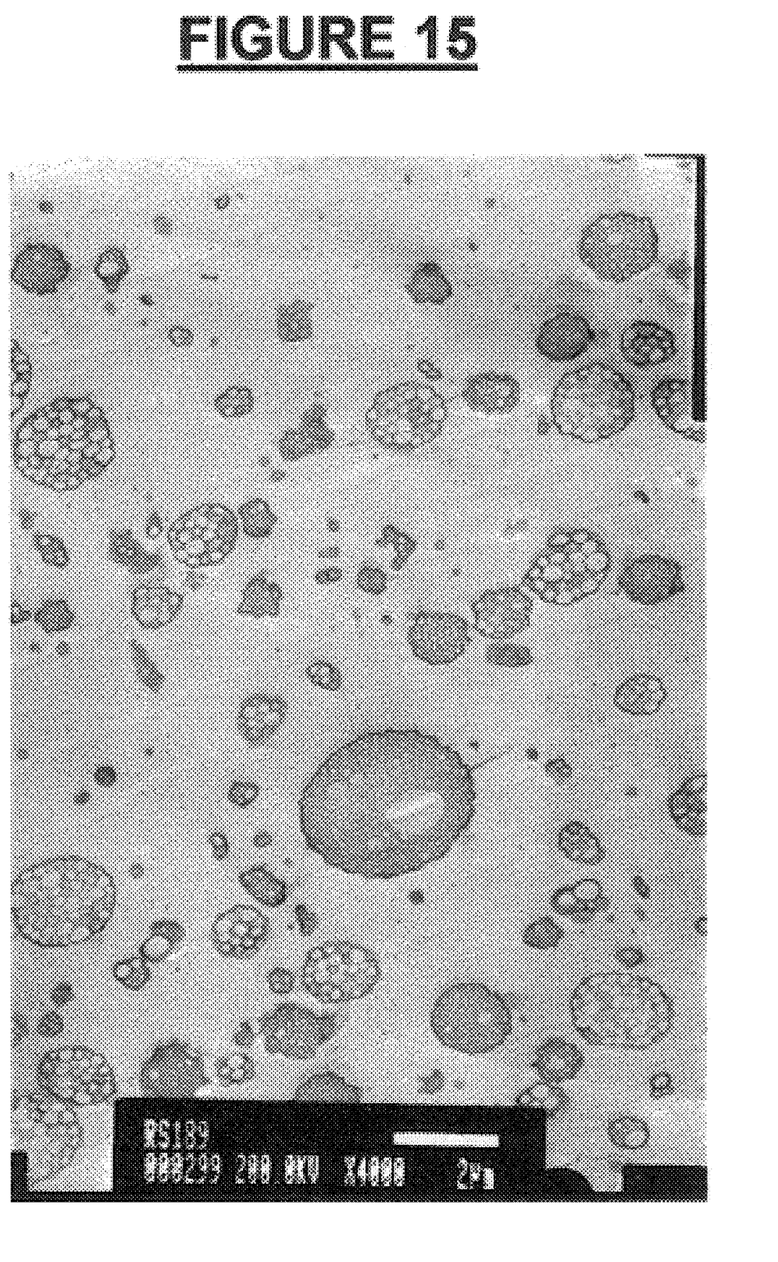

FIGS. 13, 14, and 15 illustrate the morphology of the reactant solution immediately following the second CSTR. FIG. 13 is the sample from a purely thermal reaction in the EUR system using no initiators. The RPSD and morphology of this run are almost identical to those of the benchmark sample of FIG. 4. However, running the present invention on purely thermal reaction is very slow and the production rate or conversion rate is so slow as to be economically unfeasible. FIG. 14 is an EUR reactor run with 200 PPM of TAEC initiator showing good RPSD but the morphology is not as good as desired because of the presence of some irregular shaped large particles. FIG. 15 is an EUR sample made using 200 PPM of the initiator Trigonox 17. This sample shows an excellent morphology but the RPSD is not quite up to desired standards.

FIGS. 9–15 illustrate that the morphologies obtained in the EUR system at the conditions shown in the table of FIG. 3 can be varied by selection of the proper initiators and are better than those obtained from samples made in the pilot plant on two conventional CSTR type reactors having H/D ratios of 1.2 and 1.5. The morphologies of materials produced at low solids contents in the EUR system with different initiators show that the morphologies are not well defined. As the level of solids is increased, the oil-in-oil emulsion is more stable and the morphologies are better defined. FIG. 13 for example, shows good morphology and good RPSD with a noted absence of the undesirable very small particles. However the PS inclusions of this sample are not as well defined as those of the samples of FIGS. 7 and 8. FIGS. 14 and 15 however, show that the use of some initiators leads to irregular particles and small PS inclusions.

What can be concluded from these samples is that the use of the EUR system, with appropriate initiator selection, provides for the formation of stable, uniform particles and allows the control of RPSD and control of particle morphology. The use of the 3.5 H/D or 4.0 H/D ratios of EUR simulates plugflow inversion in the initial reactor and, provided that the proper shear rate represented by the mixer tip speed, is utilized, RPSD and morphologies can be tightly controlled in the EUR. The present invention combines the idea of using an elongated reactor vessel to approximate a plugflow condition while maintaining the advantage of using a "boiling" type reactor for efficient heat control (heat removal).

The advantages of the present invention are:
(a) the inversion of the polymerization reaction can proceed with a much smaller change in conversion rate as compared to the conventional process where conversion in the PIR reactor is at about 10% and in the second CSTR is at 25–30%;
(b) a narrower RPS distribution can be obtained with the invention over conventional processes due to the PFR nature of the EUR reactor and the closer control over temperature and conversion rates;
(c) a reduction in the energy load can be achieved by eliminating feed preheaters and internal tube heat exchangers; and,
(d) an increase in plant capacity can be achieved since the EUR reactor runs at a conversion rate of at least twice that of conventional reactors using a reactor vessel of approximately the same volume.

While one embodiment of the invention has been illustrated above, it is to be understood that the invention is not confined to the precise disclosure, and it will be apparent to those skilled in the art that various changes and modifications may be made in the process described and illustrated without departing from the spirit of the invention or from the scope of the claims.

What is claimed is:

1. In a process for the continuous production of high impact polystyrene wherein styrene monomer is polymerized in the presence of an elastomer dissolved therein, said process having at least one continuous-stirred tank reactor, the improvement comprising utilizing as an initial reactor, an elongated stirred tank reactor having plugflow characteristics, and wherein said elongated stirred tank reactor has a reaction zone having a length to a diameter ratio exceeding 2.

2. The process of claim 1 wherein said elongated stirred tank reactor utilizes an upflow configuration.

3. The process of claim 2 wherein there is an absence of a continuously operating preheater located prior to the elongated reactor.

4. The process of claim 3 wherein an initiator in amounts of at least 100 PPM are utilized in the styrene monomer/elastomer solution in said elongated reactor.

5. The process of claim 2 wherein said elongated reactor reaction zone has a height to diameter ratio of about 3 to about 4.

6. The process of claim 2 wherein said stirred tank reactor has at least one paddle stirrer located rotatably therein, arranged to rotate at a tip speed of about 60 to about 150 feet per minute.

7. The process of claim 5 wherein said stirred tank reactor has at least one paddle stirrer located rotatably therein, arranged to rotate at a tip speed of about 60 to about 150 feet per minute.

8. The process of claim 2 wherein said elongated reactor comprises at least three reaction zones, a bottom preinversion zone, a middle inversion zone, and an upper heat vaporization zone.

9. The process of claim 8 wherein said elongated reactor has at its upper end a vapor removal conduit communicating with said upper heat vaporization zone.

10. The process of claim 8 wherein said process further comprises at least one continuous stirred tank reactor and at least one plugflow reactor located downstream of said elongated reactor.

11. The process of claim 8 wherein the percent solids in the elongated reactor is maintained at a level of about two to three times the initial level of elastomer contained in the feed to the process, thereby insuring that inversion is achieved in the elongated reactor.

12. A process for the continuous production of elastomer-modified polystyrene, said process comprising the steps of:

A. Introducing an initial, non-preheated, feedstock solution of elastomer and styrene monomer into an elongated upflow reactor after first warming said reactor to operating temperature;

B. Adding a polymerization initiator to said feedstock solution while introducing the feedstock into said reactor;

C. Flowing said solution upward in said reactor and reacting said styrene monomer, elastomer, and initiator to form a partially polymerized solution having styrene-elastomer particles therein, and wherein said reacting step moves said solution past the inversion point;

D. Controlling the size of particles being formed in said reactor by stirring said solution with rotating stirring paddles having a tip speed of about 60 to about 150 feet per minute;

E. Continuing to react said solution in said reactor as it moves upwardly therethrough, thereby carrying said reaction considerably past said inversion point; and, F. Flowing said solution into a second stirred reactor vessel to achieve further conversion of the solution into elastomer-modified polystyrene.

13. The process of claim 12 wherein said initiator is a peroxide initiator and said second stirred reactor is a continuous stirred tank reactor.

14. The process of claim 12 wherein said initiator is a peroxide initiator and said second stirred reactor is an elongated upflow reactor.

* * * * *